No. 614,342. Patented Nov. 15, 1898.
L. L. PLETCHER.
EGG TESTER.
(Application filed Feb. 16, 1898.)
(No Model.) 2 Sheets—Sheet 1.
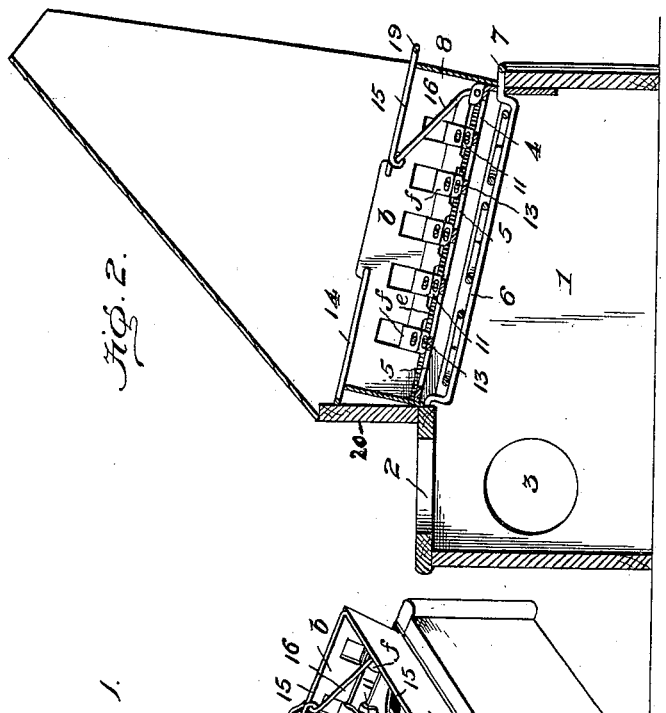
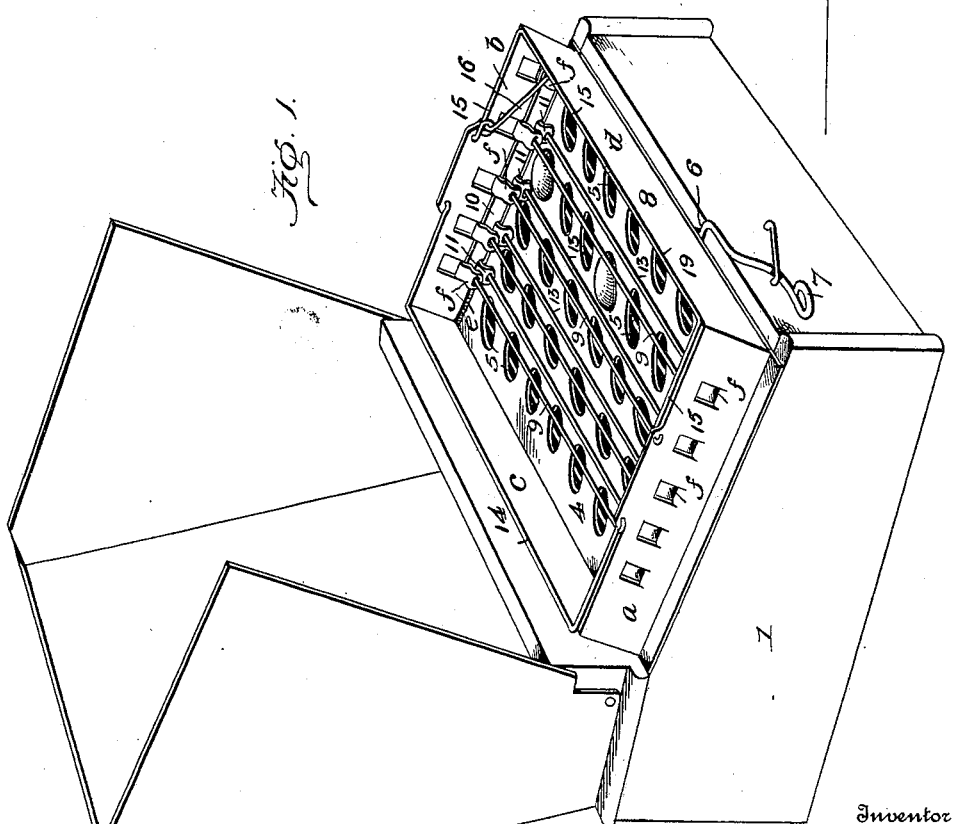
Witnesses Inventor
— L. L. Pletcher —
Attorneys No. 614,342. Patented Nov. 15, 1898.
L. L. PLETCHER.
EGG TESTER.
(Application filed Feb. 16, 1898.)
(No Model.) 2 Sheets—Sheet 2.
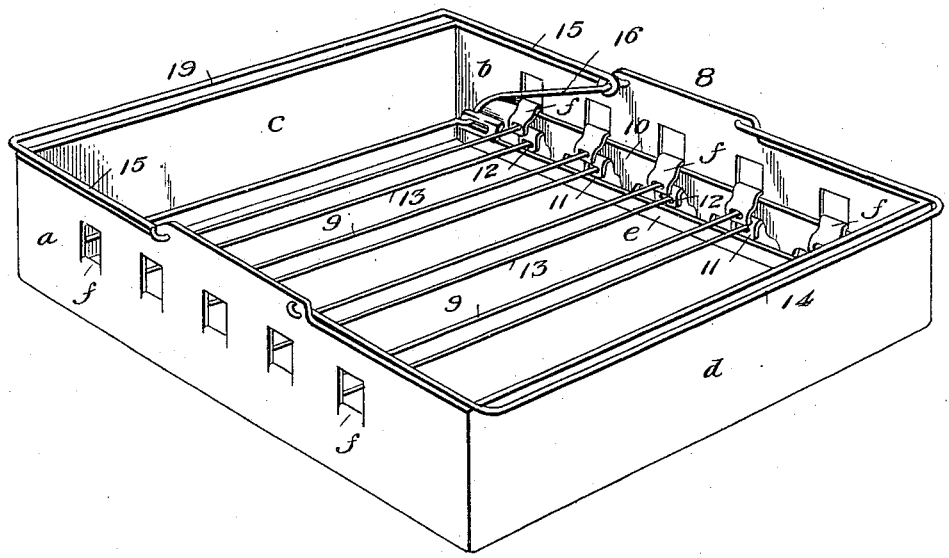
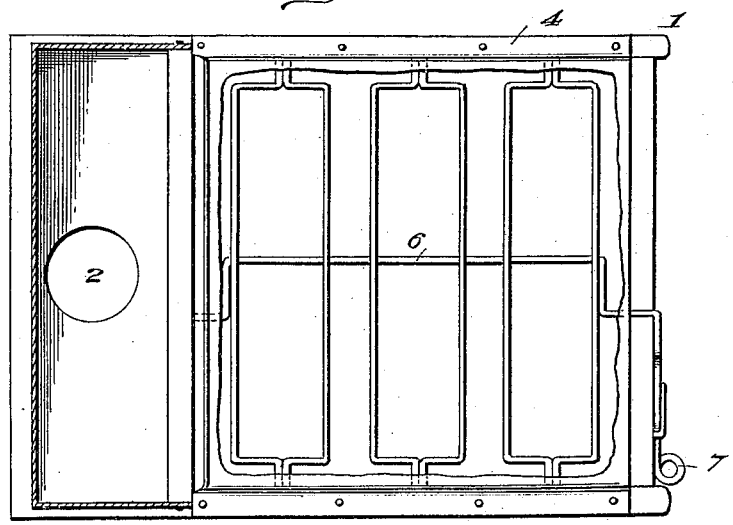
Witnesses Inventor
L. L. Pletcher
by
Attorneys

UNITED STATES PATENT OFFICE.

LEVI L. PLETCHER, OF McCONNELSVILLE, OHIO, ASSIGNOR TO JOHN F. DAVIS, OF MALTA, OHIO.

EGG-TESTER.

SPECIFICATION forming part of Letters Patent No. 614,342, dated November 15, 1898.

Application filed February 16, 1898. Serial No. 670,546. (No model.)

*To all whom it may concern:*

Be it known that I, LEVI L. PLETCHER, a citizen of the United States, residing at McConnelsville, in the county of Morgan and State of Ohio, have invented certain new and useful Improvements in Egg-Testers; and I do declare the following to be a full, clear, and exact description of the invention, such as will enable others skilled in the art to which it appertains to make and use the same.

My invention has relation to egg-testers.

The objects of my invention are, first, to provide means whereby the hood or cover of the tester may be swung back without interfering with the chimney of the lamp or the draft therefrom; secondly, to provide a tray for supporting the eggs which after the eggs have been tested may be removed from the tester and allow of the simultaneous discharge of the eggs into a box or vessel, thus overcoming the necessity of removing the eggs separately from the tray, and, thirdly, to provide means for turning the eggs while being tested.

With these objects in view the invention consists in certain features of construction and combination of parts, which will be hereinafter fully described and claimed.

In the accompanying drawings, Figure 1 is a perspective view of my improved egg-tester, showing the cover or hood swung back. Fig. 2 is a longitudinal sectional view showing the cover in position. Fig. 3 is a detail perspective view of the tray; and Fig. 4 is a top plan view, the tray being removed and portions of the egg-plate broken away, so as to show the arrangement of the egg turner or lifter and its connection with the sides of the tray.

In said drawings, 1 denotes the frame, which may be of any well-known or approved construction, having the chimney-hole 2 and a hole 3 in its side, through which the fingers may be inserted for raising or lowering the wick.

4 denotes the egg-plate, which has apertures 5 to support the eggs while they are being inspected. Located underneath this plate is an egg turner or lifter, which consists of a series of three (more or less) bails, the ends of which are pivoted in the sides of the casing, permitting of the bails having a swinging movement under the apertures in the plate, whereby when they engage the eggs that partly protrude through the plate said eggs will be pushed up, allowing rods on the tray to pass under them.

6 denotes a crank-shaft located under the pivoted bails and supporting the same in horizontal position. The ends of this crank-shaft are pivoted in the ends of the casing, and one of the ends is formed with a handle 7, by means of which the shaft is turned and the bails swung back and forth under the apertures in the egg-plate to rotate or shift the position of the eggs in order to permit of perfect inspection.

8 denotes the egg-tray, which consists of the side pieces *a b* and end pieces *c d*. The side pieces *a b* are provided with guides *e f*, formed, preferably, by turning up the lower edges of the side pieces, whereby the guides *e* are made, and by cutting out and turning down tongues, whereby the guides *f* are made. The guides *f* also serve an additional function—namely, that of supporting the rods 9 and permitting of a slight movement of said rods, this being effected by forming the tongues or guides *f* with transverse elongated apertures that receive the ends of the rods.

Located between the guides are bars 10, which are provided with ears 11, struck out from the bar, said ears having transverse elongated apertures 12 that support the ends of rods 13.

14 denotes a handle-bail, pivoted to the sides of the tray, and 15 denotes a similar handle, which is pivoted to the sides of the tray and has a link 16 projecting downwardly and connected with the outer ends of the sliding bars and connected together by a rod 19. By this construction I am enabled to shift the lower set of rods for a purpose hereinafter to appear.

In operation, the parts being assembled as shown in Fig. 1, the eggs are placed in the opening in the egg-plates, which openings are arranged in horizontal series and between the rods of the tray. The handles of the tray being lowered or folded down bring the two sets of rods 9 and 13 parallel, one set under the other set, so that the eggs may freely sink into the apertures of the egg-plate. As the eggs are being tested it is often desired to turn them to more freely inspect them. This is done by working the handle of the rock-shaft, which causes the bails to be swung under the apertures in the egg-plate into engagement with the eggs, and thereby rock or turn them. After the eggs have been tested, instead of removing them individually, as has been heretofore the case, the handles of the tray are raised and grasped in the hand. In raising the handles it will be noticed that the lower set of rods 13 will be moved under the eggs, thereby elevating the same from the holes in the egg-plate and supporting them. In this position the eggs may be removed from the tester, and if it is desired to empty them into a crate or box the tray is lowered into said receptacle, and by dropping one handle the lower set of rods 13 will move from under the eggs and allow them to fall from between the upper set of rods 9.

To enable the hood or cover to be swung back for the purpose of removing the tray, I provide a transverse board or partition 20, which is secured to the top of the frame immediately at the rear of the tray and in advance of the chimney-opening. When the hood is swung down and the eggs are being tested, this partition obstructs the light, preventing the same entering at the rear end of the hood, and when the hood is swung back it passes over the chimney and does not obstruct the draft therethrough. This is considered a very important feature of my invention.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

In an egg-tester, the combination with the casing, of an egg-plate secured thereto and provided with egg-openings, a tray seated upon said casing and provided with two sets of parallel rods, one set arranged below the other, means for shifting the lower set under the eggs supported by the upper set, thus forming a bottom and preventing the eggs supported by the upper set dropping through the same, bails pivoted below the openings in said egg-plate and having a swinging movement under the same, and means for rocking said bails to change the position of the eggs and to push them up through the holes in the egg-plate, in order to permit the lower set of rods in the tray to pass under them, substantially as set forth.

In testimony whereof I have hereunto set my hand in presence of two subscribing witnesses.

LEVI L. PLETCHER.

Witnesses:
   CALEB H. HOOPER,
   GEO. S. CORNER.